(12) United States Patent
Xie (10) Patent No.: US 10,969,793 B2
(45) Date of Patent: Apr. 6, 2021

(54) METHOD AND DEVICE FOR CONTROLLING ROBOTIC CLEANER AND ELECTRONIC DEVICE

(71) Applicant: Beijing Xiaomi Mobile Software Co., Ltd., Beijing (CN)

(72) Inventor: Yan Xie, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 316 days.

(21) Appl. No.: 15/824,636

(22) Filed: Nov. 28, 2017

(65) Prior Publication Data

US 2018/0147717 A1     May 31, 2018

(30) Foreign Application Priority Data

Nov. 29, 2016   (CN) .......................... 201611078292.6

(51) Int. Cl.
    *G05D 1/02*          (2020.01)
(52) U.S. Cl.
    CPC .......... *G05D 1/0246* (2013.01); *G05D 1/0282* (2013.01); *G05D 2201/0203* (2013.01)
(58) Field of Classification Search
    CPC ...... G05D 1/02; G05D 1/0212; G05D 1/0246; G05D 1/0282; G05D 2201/0203; B25J 9/1602; B25J 9/1679; H04W 4/021
    See application file for complete search history.

(56) References Cited

U.S. PATENT DOCUMENTS

| 5,270,764 | A  | * | 12/1993 | Ichihara | G03B 17/40 396/106 |
| 10,140,769 | B2 | * | 11/2018 | Kim | G06F 3/14 |
| 2004/0066451 | A1 | * | 4/2004 | Schroth | F42B 12/365 348/144 |
| 2006/0028548 | A1 | * | 2/2006 | Salivar | H04N 7/185 348/143 |
| 2012/0103367 | A1 | * | 5/2012 | Tang | G05D 1/0246 134/18 |
| 2014/0124004 | A1 | * | 5/2014 | Rosenstein | G06T 7/246 134/18 |
| 2014/0313596 | A1 | * | 10/2014 | Hashimoto | G02B 13/06 359/714 |
| 2014/0336863 | A1 | * | 11/2014 | So | A47L 9/2815 701/28 |

(Continued)

FOREIGN PATENT DOCUMENTS

| EP | 2801313 A2 | 11/2014 |
| EP | 3023873 A1 | 5/2016 |

OTHER PUBLICATIONS

EP Search Report mailed in corresponding European Patent Application No. 17204451.3 dated Apr. 6, 2018, 9 pages.

(Continued)

*Primary Examiner* — Bhavesh V Amin
(74) *Attorney, Agent, or Firm* — Arch & Lake LLP (57) ABSTRACT

A method and a device are provided for controlling a robotic cleaner. According to an example of the method, an environment image of an area may be acquired, and a sub-area to be swept in the area may be determined based on the environment image. Then, the robotic cleaner may be controlled to reach the sub-area to be swept and perform a sweeping task in the sub-area to be swept.

20 Claims, 8 Drawing Sheets

(56) References Cited

U.S. PATENT DOCUMENTS

| | | | |
|---|---|---|---|
| 2015/0032260 A1* | 1/2015 | Yoon | A47L 11/4011 700/257 |
| 2016/0058261 A1* | 3/2016 | Dyson | A47L 7/00 96/423 |
| 2016/0104044 A1* | 4/2016 | Noh | G05D 1/0248 382/106 |
| 2016/0129593 A1* | 5/2016 | Wolowelsky | G05D 1/0274 700/253 |
| 2016/0148417 A1* | 5/2016 | Kim | G06T 19/006 345/419 |
| 2016/0167233 A1* | 6/2016 | Zhang | H04W 4/025 382/153 |
| 2016/0260161 A1* | 9/2016 | Atchley | G05D 1/0016 |
| 2018/0189565 A1* | 7/2018 | Lukierski | G06T 7/55 |

OTHER PUBLICATIONS

State Intellectual Property Office of the People's Republic of China, Office Action and Search Report Issued in Application No. 2016110782926, dated Dec. 28, 2018, 18 pages, (Submitted with MachineTranslation).

Office Action issued in European Patent Application No. 17204451.3 dated Feb. 14, 2020, (8p).

* cited by examiner

METHOD AND DEVICE FOR CONTROLLING ROBOTIC CLEANER AND ELECTRONIC DEVICE

CROSS REFERENCE TO RELATED APPLICATION

The present disclosure claims priority to Chinese Patent Application No. 201611078292.6 entitled "METHOD AND DEVICE FOR CONTROLLING ROBOTIC CLEANER AND ELECTRONIC DEVICE" which was filed on Nov. 29, 2016, the entire content of which is incorporated herein by reference.

TECHNICAL FIELD

The present disclosure relates to methods and devices for controlling a robotic cleaner.

BACKGROUND

With the development of science and technology, more and more users begin to use robotic cleaners to sweep a living or working area, which greatly reduces the human input and guarantees the cleanliness of a living or working environment while saving time of users. A robotic cleaner is usually associated with a remote control. A user sets a sweeping point for the robotic cleaner through the remote control, that is, the user specifies an area to be swept. Alternatively, the robotic cleaner may perform an automatic sweeping mode for the whole area.

SUMMARY

An example of the present disclosure provides a method and a device for controlling a robotic cleaner and an electronic device. The technical solution is as follows.

According to an example of the present disclosure, there is provided a method of controlling a robotic cleaner. The method may include: acquiring an environment image of an area; determining a sub-area to be swept in the area based on the environment image; and controlling the robotic cleaner to reach the sub-area to be swept and perform a sweeping task in the sub-area to be swept.

According to an example of the present disclosure, there is provided a device for controlling a robotic cleaner including a processor and a memory for storing processor-executable instructions. The processor is configured to execute the processor-executable instructions to: acquire an environment image of an area; determine a sub-area to be swept in the area based on the environment image; and control the robotic cleaner to reach the sub-area to be swept and perform a sweeping task in the sub-area to be swept.

According to an example of the present disclosure, there is provided an electronic device comprising the device for controlling a robotic cleaner described above.

According to an example of the present disclosure, there is provided a computer-readable storage medium having stored thereon computer program instructions which cause a processor to implement the blocks of the method of controlling a robotic cleaner described above when being executed by the processor.

It is to be understood that both the foregoing general description and the following detailed description are exemplary and explanatory only and do not limit the present disclosure.

The details of one or more examples of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

BRIEF DESCRIPTION OF DRAWINGS

The drawings herein are incorporated in and constitute a part of this specification, showing examples coincident with the present disclosure and serve together with the specification to explain the principles of the present disclosure.

DETAILED DESCRIPTION

An exemplary example will be described in detail herein, examples of which are shown in the accompanying drawings. When the following description refers to the accompanying drawings, the same numerals in the different drawings denote the same or similar elements unless otherwise indicated. The examples described in the following exemplary embodiments are not representative of all examples coincident with the present disclosure. In contrast, they are merely examples of devices and methods coincident with some aspects of the present disclosure as detailed in the appended claims.

Figure 1A:
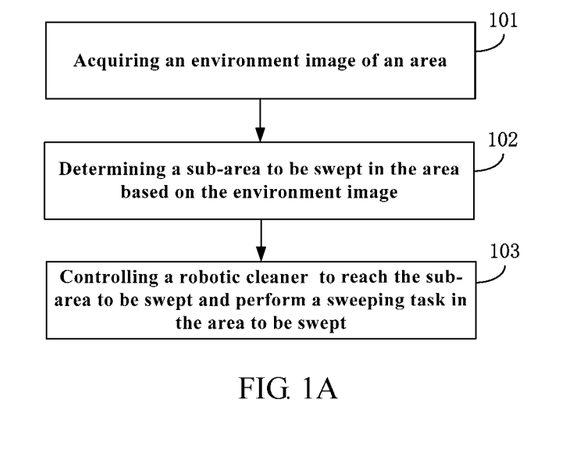
FIG. 1A illustrates a flow diagram of a method of controlling a robotic cleaner according to an example.
Figure 1B:
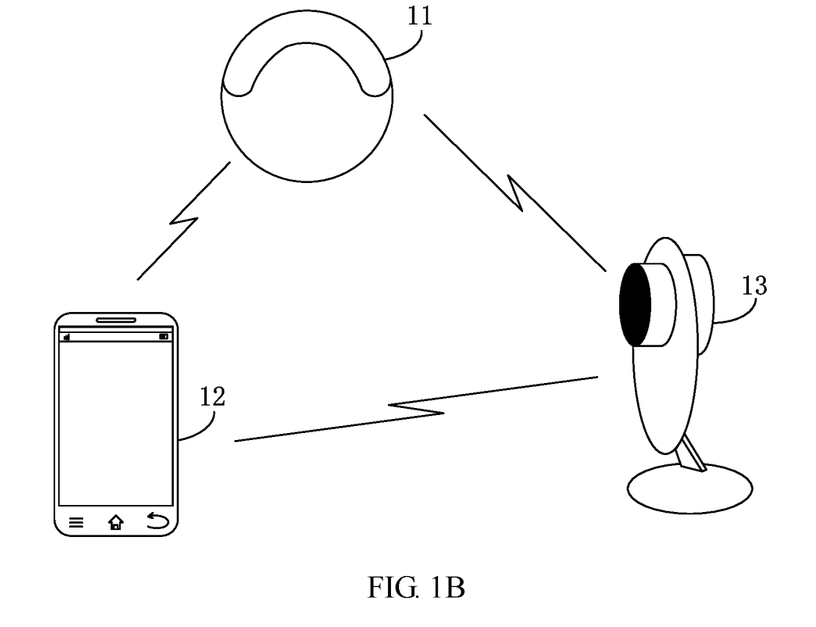
FIG. 1B illustrates a schematic diagram of a method of controlling a robotic cleaner according to the example shown in FIG. 1A.
Figure 1C:
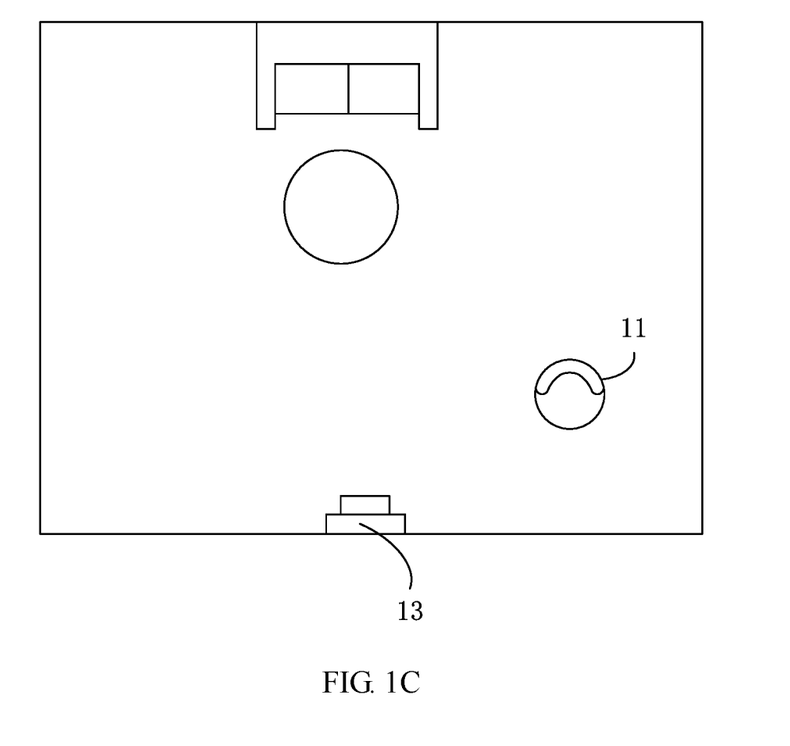
FIG. 1C illustrates a schematic diagram of a space in which an image capturing device is located according to the example shown in FIG. 1A.
Figure 1D:
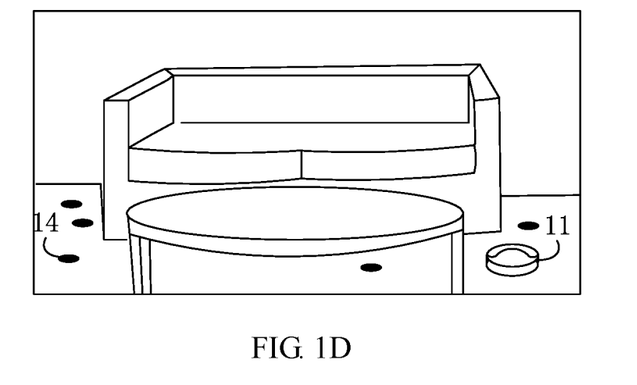
FIG. 1D illustrates a schematic diagram of an environment image according to the example shown in FIG. 1A.

FIG. 1A illustrates a flow diagram of a method of controlling a robotic cleaner according to an example. FIG. 1B illustrates a schematic diagram of a method of controlling a robotic cleaner according to the example shown in FIG. 1A. FIG. 1C illustrates a schematic diagram of a space in which an image capturing device is located according to the example shown in FIG. 1A. FIG. 1D illustrates a schematic diagram of an environment image according to the example shown in FIG. 1A. The method of controlling a robotic cleaner may be applied to a mobile device such as a smart phone or a tablet computer, or may be applied to a camera or a robotic cleaner. As shown in FIG. 1A, the method of controlling a robotic cleaner includes the following Blocks S101 to S103.

In block S101: an environment image of an area is acquired. For example, the mobile device may acquire the environment image from its own local storage or from a storage in any paired device in the area. The paired device may be a security camera or other camera device that is located in the area and is in communication with the mobile device.

Additionally or alternatively, the robotic cleaner may include a camera or other image sensor on itself. For example, the robotic cleaner may include a retractable and rotatable camera sensor on top of the housing of the robotic cleaner. The rotatable camera sensor may rotate 360 degrees. The retractable and rotatable camera sensor may be disposed at least partially in the housing when it is not activated. When activated, the camera is extended out from the housing. When activated, the camera sensor can capture the environment surrounding the robot cleaner. How the camera sensor rotates may also be set or selected before cleaning. When the camera sensor is in the contracted state and not activated, the image acquisition is stopped.

In some embodiments, the camera can be hidden below the robot's top case (inside the robot cleaner's case) while the camera is in the contracted state. The camera can be periodically extended (automatically retracted after detection) to periodically detect if there is any area to be cleaned, or it can be extended or retracted when an instruction is received from a paired device.

In an example, the environment images taken at different angles or at different positions in an area may be captured using a camera on a mobile device. In another example, a camera on a video camera may be controlled by means of a mobile device in a remote control manner to capture the environment images at different angles in the area. In the disclosure, the area may be an enclosed area indoor, an open area such as a square, etc. The present disclosure is not limited to these areas. All the areas that need to be swept by a robotic cleaner may be regarded as the area described in the present disclosure.

In another example, the robotic cleaner may move from room to room and acquire at least one environment image for each room from different paired device in different rooms. The robotic cleaner may determine which image to use based on the relative signal strengths from the paired devices. Alternatively or additionally, the robotic cleaner may be pre-set such that it uses images from a particular paired device in a specific location.

In block S102: a sub-area to be swept in the area is determined based on the environment image. The mobile device may determine or select the sub-area to be swept according to a user input or automatically based on predetermined rules.

In an example, the area to be swept may be a partial spatial area in the area. How to determine a sub-area to be swept based on an environment image may refer to the following description of the example shown in any of FIG. 2 to FIG. 4 below, which will not be described in detail herein.

In block S103: the robotic cleaner is controlled to reach the sub-area to be swept and perform a sweeping task in the sub-area to be swept. The mobile device may send an instruction to the robotic cleaner and the specific route and directions for the robotic cleaner to reach the sub-area from its current location.

How to control the robotic cleaner to reach the sub-area to be swept may refer to the related description of the example shown in any of FIG. 2 to FIG. 4 below, which will not be described in detail herein.

Performing a sweeping task in the sub-area to be swept may be carried out by a robotic cleaner using any technique known to those skilled in the art, which will not be described in detail in the present disclosure.

In an exemplary scenario, a method of controlling a robotic cleaner provided by the present disclosure is executed by a mobile device, which is used as an example. As shown in FIG. 1B, a robotic cleaner 11 and a mobile device 12 are located in a same area. For example, FIG. 1C illustrates an area defined by a room. The mobile device 12 captures an environment image through its camera. For example, the environment image is as shown in FIG. 1D. The mobile device 12 determines a sub-area to be swept in an indoor area based on the environment image and controls the robotic cleaner 11 to reach the sub-area to be swept and perform a sweeping task in the sub-area to be swept. For example, the sub-area to be swept is the sub-area where black dots are located as shown in FIG. 1D. It is to be noted that the robotic cleaner 11 may also determine the sub-area to be swept based on the environment image transmitted by the mobile device 12 and move to the sub-area to be swept to perform a sweeping task.

In another exemplary scenario, a method of controlling a robotic cleaner provided by the present disclosure is executed by a video camera 13, which is used as an example. As shown in FIG. 1B, the video camera 13 may operate in a preset timing control manner. When a preset time point is reached, the video camera 13 may control its camera to capture an environment image, determine a sub-area to be swept in an area based on the environment image, and control the robotic cleaner 11 to reach the sub-area to be swept and perform a sweeping task. It is to be noted that the robotic cleaner 11 may also determine the sub-area to be swept based on the environment image transmitted by the video camera 13 and move to the sub-area to be swept to perform a sweeping task.

In still another exemplary scenario, a method of controlling a robotic cleaner provided by the present disclosure is executed by the robotic cleaner 11, which is used as an example. As shown in FIG. 1B, the robotic cleaner 11 is provided with a camera. The robotic cleaner 11 may control its camera to capture an environment image in a preset control manner, determine a sub-area to be swept in the area based on the environment image, and reach the sub-area to be swept and perform a sweeping task.

In the present example, the robotic cleaner is controlled to perform specific sweeping in the sub-area to be swept by identifying the sub-area that needs to be swept in the area based on the environment image, which may improve the sweeping efficiency of the robotic cleaner and may simplify the operation of controlling the robotic cleaner from a user.

How to control a robotic cleaner to sweep may refer to the subsequent examples.

The above method provided by the examples of the present disclosure may control a robotic cleaner based on an environment image to sweep the sub-area that needs to be swept, which may improve the sweeping efficiency of the robotic cleaner and simplify the operation of controlling the robotic cleaner from the user.

Figure 2:
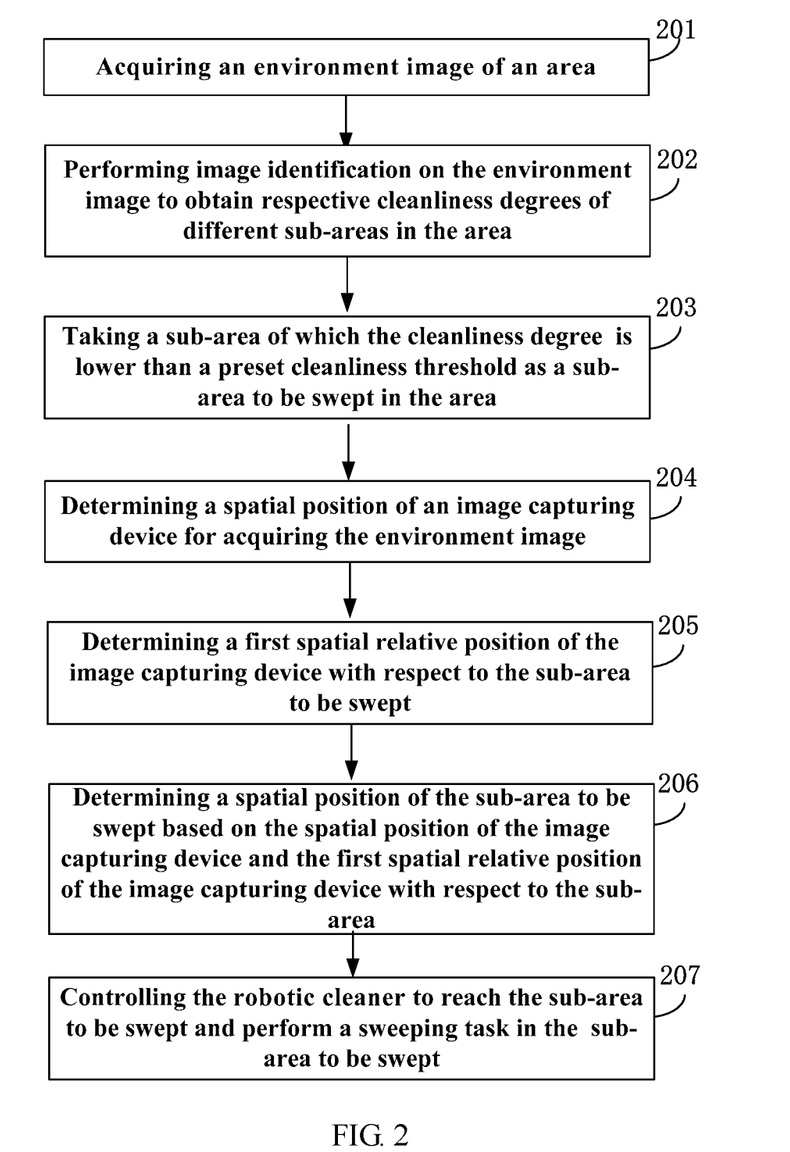
FIG. 2 illustrates a flow diagram of a method of controlling a robotic cleaner according to another example.

FIG. 2 illustrates a flow diagram of a sweeping method according to another example. How to determine a sub-area to be swept in an area based on an environment image and how to control a robotic cleaner to reach the sub-area to be swept are described as an example in conjunction with FIG. 1D. As shown in FIG. 2, the following Blocks S201 to S207 are included.

In block S201: an environment image of an area is acquired.

The Block S201 may refer to the above description of the example shown in FIG. 1A, which will not be described in detail.

In block S202: image identification is performed on the environment image to obtain respective cleanliness degrees of different sub-areas in the area. The robotic cleaner may divide the image to sub-areas and obtain cleanliness degrees in each sub-area by comparing the most recent image with a previously stored image of the same environment.

For example, obvious garbage in an environment image, such as paper balls, paper chips, etc., may be identified, and the cleanliness degrees of different sub-areas in an area may be determined according to percentages of a number of pixels of the identified paper balls, paper chips, etc. in the pixels of the environment image. The cleanliness degree corresponds to a higher value for a sub-area not covered by paper balls, paper chips, etc.; and the cleanliness degree corresponds to a lower value for a sub-area covered by paper balls, paper chips, etc.

In another example, colors of different sub-areas in the environment image may be identified. If a depth of the color of a sub-area is close to that of a normal color of the area (e.g., floor), the cleanliness degree of the sub-area corresponds to a higher value; if the depth of the color of a sub-area has a great difference from that of the normal color of the area, it indicates that the sub-area may be covered with dirt or other matters, and the cleanliness degree corresponds to a lower value. By quantifying the cleanliness degrees of different sub-areas in an area, a sub-area to be swept in the area may be accurately identified.

In block S203: a sub-area where the cleanliness degree is lower than a preset cleanliness threshold is taken as the sub-area to be swept in the area.

In an example, a preset cleanliness threshold may be defined by a user according to a cleanliness degree that the user may tolerate for the area, and the present disclosure does not limit the specific value of the pre-set cleanliness threshold.

In block S204: a spatial position of an image capturing device for acquiring the environment image is determined.

In an example, the spatial position of the image capturing device may be determined based on satellite positioning (such as GPS positioning). The spatial position may be represented by a longitude, a latitude, and/or an altitude. For example, a GPS module may be provided in the image capturing device, and the position of the image capturing device may be determined by the GPS module.

In block S205: a first spatial relative position of the image capturing device with respect to the area to be swept is determined. The robotic cleaner may determine the first spatial relative position using one or more sensors.

For example, a laser generator may be mounted on the image capturing device to emit laser to an object that has been captured by the image capturing device (for example, the ground). After the image capturing device receives laser reflected by the captured object, a spatial distance between the image capturing device and the sub-area to be swept is determined according to a time difference between the emitted laser and the reflected laser. Moreover, an azimuth angle between the image capturing device and the captured object is determined based on an azimuth sensor of the image capturing device. The first spatial relative position of the image capturing device with respect to the sub-area to be swept is then obtained. The spatial distance between the image capturing device and the sub-area to be swept may be calculated quickly and accurately in a manner of laser ranging. And the azimuth angle between the image capturing device and the sub-area to be swept may be determined quickly and accurately by the azimuth sensor.

In block S206: a spatial position of the sub-area to be swept is determined based on the spatial position of the image capturing device and the first spatial relative position of the image capturing device with respect to the sub-area to be swept.

In one example, the spatial position of the image capturing device and the first spatial relative position of the image capturing device with respect to the sub-area to be swept may be vector-added to obtain a spatial position of the sub-area to be swept. For example, the position of the image capturing device obtained at the above Block S204 is (x, y, z), and the first spatial relative position of the image capturing device with respect to the sub-area to be swept is ($\Delta x$, $\Delta y$, $\Delta z$), consequently, the spatial position of the sub-area to be swept is (x+$\Delta x$, y+$\Delta y$, z+$\Delta z$).

In block S207: the robotic cleaner is controlled to reach the spatial position of the sub-area to be swept and perform a sweeping task in the sub-area to be swept.

In an example, a distance difference value between a position where the robotic cleaner is located and the spatial position of the sub-area to be swept (x+$\Delta x$, y+$\Delta y$, z+$\Delta z$) may be detected in real time in a manner of wireless communication such as Bluetooth. When the distance difference value approaches zero, it is determined that the robotic cleaner reaches the spatial position of the sub-area to be swept (for example, the position corresponding to the reference numeral 14 as shown in FIG. 1D) and the robotic cleaner is controlled to perform a sweeping task.

In the present example, by determining the cleanliness degrees of different sub-areas in the area from the environment image, a position where the cleanliness degree is lower than a preset cleanliness threshold is taken as the sub-area to be swept, so that the robotic cleaner may perform specific sweeping in the sub-area to be swept to avoid unnecessary sweeping of a position where sweeping is not required and to improve the sweeping efficiency. In the case where the position of the image capturing device has been determined, the spatial position of the sub-area to be swept is determined based on the first spatial relative position of the image capturing device with respect to the sub-area to be swept to realize the accurate positioning of the spatial position of the sub-area to be swept based on the two-dimensional environment image.

Figure 3:
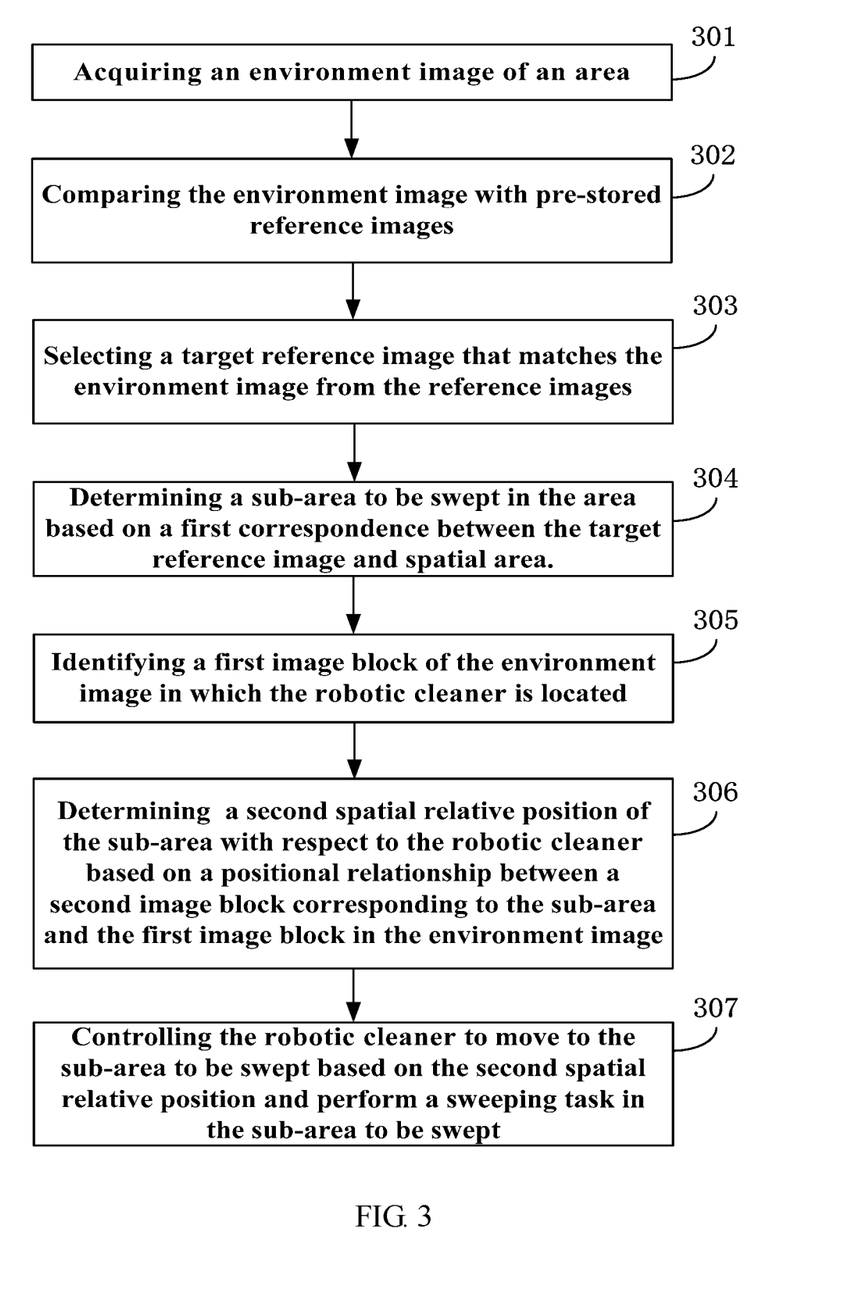
FIG. 3 illustrates a flow diagram of a method of controlling a robotic cleaner according to still another example.

FIG. 3 illustrates an example flow diagram of a sweeping method according to still another aspect of the disclosure. Here, how to determine a sub-area to be swept in an area based on an environment image and how to control the robotic cleaner to reach the sub-area to be swept are used as an example in conjunction with FIG. 1D. As shown in FIG. 3, the following Blocks S301 to S307 are included.

In block S301: an environment image of an area is acquired. The Block S301 may refer to the above description of the example shown in FIG. 1A, which will not be described in detail.

In block S302: the environment image is compared with one or more pre-stored reference images. For example, the prestored reference images may be images corresponding to different spatial areas (or referred to as area blocks) in an area. For example, the reference images may be images captured by an image capturing device corresponding to each of the spatial areas at different angles, or may be a plurality of images or image blocks obtained by dividing an image of the area. Alternatively, the reference images may be images of the above spatial areas in clean states. For example, the image capturing device captures at an angle a reference image when the floor at the left side of a sofa is in a clean state and captures at another angle another reference image when the floor at the right side of the sofa is in a clean state. Herein, the environment image is compared with the pre-stored reference images to determine a reference image matching the environment image. Alternatively, the comparison process may be to compare all the pixels in the environment image, or only to compare some of the pixels in the environment image.

It will be appreciated by those skilled in the art that how to compare an environment image with reference images may adopt an algorithm about image matching or other algorithms.

In block S303: a target reference image that matches the environment image is selected from all the reference images. Herein, matching of the environment image with the target reference image may be that the environment image and the target reference image satisfy a preset condition. For example, the environment image and the target reference image have similar contents (it may be considered that the area block corresponding to the environment image and the area block corresponding to the target reference image are similar, for example, the area blocks are balcony floor areas).

In block S304: the sub-area to be swept in the area is determined based on a first pre-set correspondence between reference image and spatial area.

In an example, an area may be divided into a plurality of spatial areas in advance (alternatively, there may be overlapping or no overlapping between different spatial areas). Images corresponding to each of the spatial areas (i.e. the reference images) are acquired, a mapping relationship between each of the spatial areas and its corresponding reference image is established, and the established mapping relationship is stored in advance, that is, the first preset correspondence between reference image and spatial area is obtained. When the environment image matches a reference image, the first pre-set correspondence between reference image and spatial area is equivalent to the correspondence between environment image and spatial area, so that the sub-area to be swept in the area may be determined based on the first pre-set correspondence.

For example, when the difference between the pixels of a particular image block in the environment image and the pixels of an image block corresponding to the same coordinate in the target reference image exceeds a preset difference value, it is considered that the physical area corresponding to the image block is the area where there is garbage, so that the spatial area corresponding to the above image block may be determined according to the first pre-set correspondence, that is, the area to be swept is determined.

In block S305: an image block where a robotic cleaner is located in the environment image is identified. In an example, the image block where the robotic cleaner is located may be identified from the environment image based on an image identification algorithm, which will not be described in detail in the present disclosure.

In block S306: a second spatial relative position of the sub-area to be swept with respect to the robotic cleaner is determined based on a positional relationship between the image block of the sub-area to be swept and the image block where the robotic cleaner is located in the environment image.

In an example, an image block of the sub-area to be swept in an environment image may be identified based on an image identification algorithm, which will not be described in detail in the present disclosure. In the environment image shown in FIG. 1D, the sub-area to be swept is the sub-area corresponding to the reference numeral 14. The robotic cleaner 11 is located to the right of the reference numeral 14. After identifying the respective areas of the reference numeral 14 and the robotic cleaner 11, since the sub-area to be swept corresponding to the reference numeral 14 has been determined at the above Block S304, the second spatial relative position of the sub-area to be swept corresponding to the reference numeral 14 with respect to the robotic cleaner 11 may be obtained based on a spatial mapping relationship. The second spatial relative position includes the distance between the sub-area to be swept and the robotic cleaner and a spatial orientation.

In block S307: the robotic cleaner is controlled based on the second spatial relative position to move to the sub-area to be swept and perform a sweeping task in the sub-area to be swept.

As shown in FIG. 1D, the robotic cleaner 11 may be controlled to move to the sub-area to be swept represented by the reference numeral 14 based on the second spatial relative position including the distance between the sub-area to be swept and the robotic cleaner and the spatial orientation until the sub-area to be swept represented by the reference numeral 14 is reached so that the sweeping task may be performed subsequently.

In the present example, the target reference image matching the environment image in the pre-stored reference images is determined, and then the sub-area to be swept in an area is determined. Since the first pre-set correspondence between the pre-stored reference image and the spatial area may be pre-defined, the computation complexity of identifying the sub-area to be swept is reduced; the robotic cleaner is controlled based on the second spatial relative position to move to the sub-area to be swept and perform a sweeping task in the sub-area to be swept so that the robotic cleaner is controlled in a three-dimensional space based on a two-dimensional image and the controlling process of the robotic cleaner is more intuitive.

Figure 4:
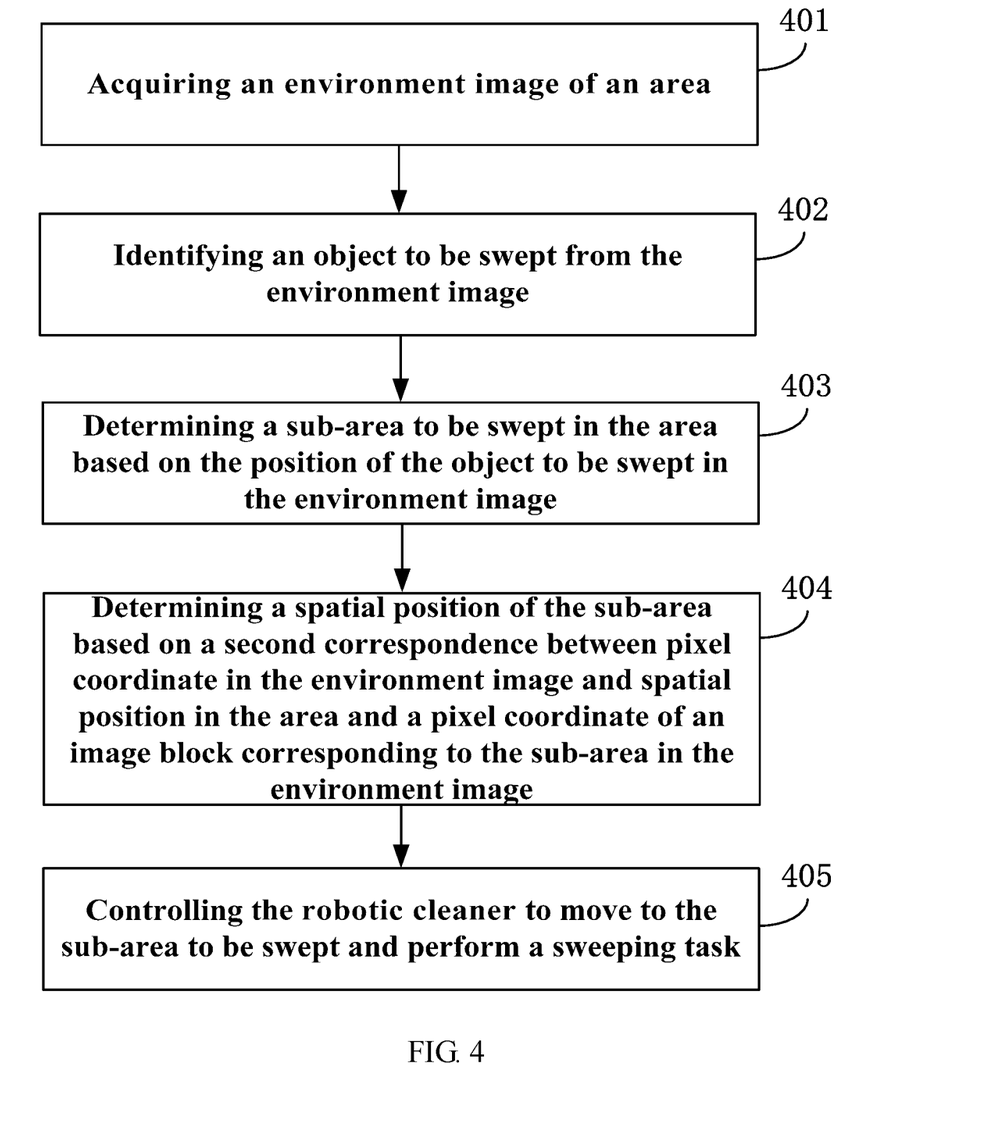
FIG. 4 illustrates a flow diagram of a method of controlling a robotic cleaner according to yet another example.

FIG. 4 illustrates a flow diagram of a method of controlling a robotic cleaner according to yet another example; how to determine a sub-area to be swept in an area based on an environment image and how to control the robotic cleaner to reach the sub-area to be swept are used as an example in conjunction with FIG. 1D. As shown in FIG. 4, the following Blocks S401 to S405 are included.

In block S401: an environment image of an area is acquired. The Block S401 may refer to the above description of the example shown in FIG. 1A, which will not be described in detail.

In block S402: an object to be swept is identified from the environment image. In an example, the object to be swept in the environment image may be identified based on an image identification algorithm.

In block S403: a sub-area to be swept in an area is determined based on a position of the object to be swept in the environment image. In an example, the position of the object to be swept in the environment image may be a pixel coordinate in the environment image. In another example, the sub-area to be swept in an area may be determined based on a pre-set correspondence between the environment image and the area.

In block S404: a spatial position of the sub-area to be swept is determined based on a second pre-set correspondence between each pixel coordinate in the environment image and each spatial position in the area and a pixel coordinate of the image block of the area to be swept in the environment image. In an example, the spatial relationship between each pixel coordinate in the environment image and each spatial position in the area may be defined for the environment image collected by an image capturing device at any angle so that the second pre-set correspondence between each pixel coordinate in the environment image and each spatial position in the area may be obtained. The spatial position of the area to be swept in the area may be determined based on the second pre-set correspondence after identifying the area to be swept.

In block S405: the robotic cleaner is controlled to move to the sub-area to be swept and perform a sweeping task in the sub-area to be swept. In an example, a distance difference value between a position where the robotic cleaner is located and the spatial position of the sub-area to be swept may be detected in real time in a manner of wireless communication such as Bluetooth. When the distance difference value approaches zero, it is determined that the robotic cleaner reaches the spatial position of the sub-area to be swept and the robotic cleaner is controlled to perform the sweeping task.

In another example, as shown in FIG. 1D, the robotic cleaner 11 may be controlled to move to the sub-area to be swept represented by the reference numeral 14 until the sub-area to be swept represented by the reference numeral 14 is reached so that the sweeping task may be performed subsequently.

Here, the identification of a three-dimensional space may be converted into the processing of a two-dimensional image based on the position of the object to be swept in the environment image and the second pre-set correspondence. Thereby, the computation complexity may be reduced and the controlling process of the robotic cleaner may become more intuitive.

It will be appreciated by those skilled in the art that different combinations of the respective blocks in the examples shown in FIG. 2 to FIG. 4 may be made to obtain different examples. For example, the Blocks S201-S203 in the example shown in FIG. 2 may be combined with the Blocks S305-S307 in the example shown in FIG. 3 to obtain another example of the method of controlling a robotic cleaner. Similarly, the Blocks S201-S203 in the example shown in FIG. 2 may be combined with the Blocks S404-S405 in the example shown in FIG. 4 to obtain still another example of the method of controlling a robotic cleaner, or the Blocks S301-S304 in the example shown in FIG. 3 may be combined with the Blocks S404-S405 in the example shown in FIG. 4 to obtain yet another example of the method of controlling a robotic cleaner. The technical solutions formed by different combinations may all be regarded as examples of the present disclosure of the method of controlling a robotic cleaner, which is not recited herein.

According to an example of the present disclosure, there is provided a device for controlling a robotic cleaner to perform the above method of controlling a robotic cleaner.

Figure 5:
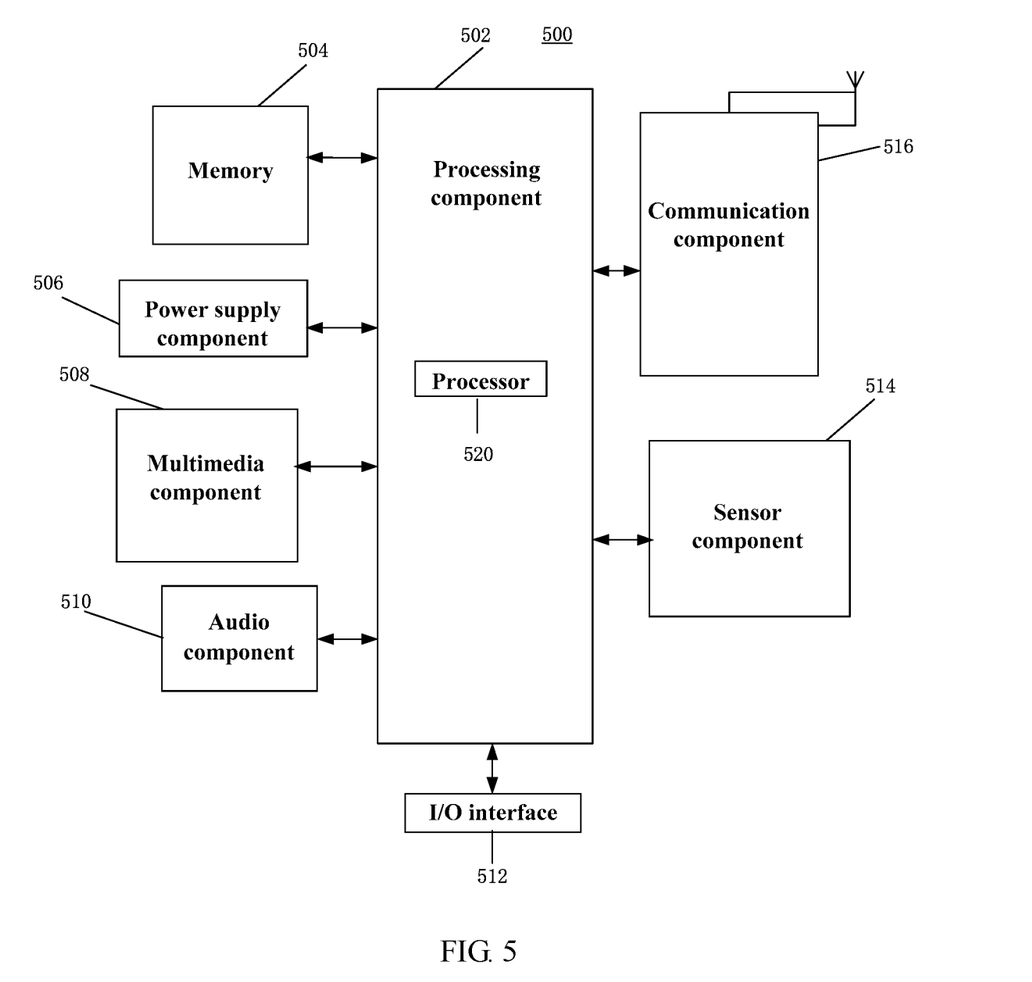
FIG. 5 illustrates a schematic diagram of a hardware structure of a device for controlling a robotic cleaner according to an example.

FIG. 5 illustrates a block diagram of a hardware structure suitable for a device for controlling a robotic cleaner according to an example. For example, a device 500 may be a mobile electronic device such as a smart phone, a tablet computer, or may be a camera, or a sweeping device such as a robotic cleaner.

Referring to FIG. 5, the device 500 may include one or more of the following components: a processing component 502, a memory 504, a power supply component 506, a multimedia component 508, an audio component 510, an input/output (I/O) interface 512, a sensor component 514, and a communication component 516.

The processing component 502 generally controls the overall operation of the device 500, such as operations associated with display, telephone calls, data communication, camera operation, and recording operations. The processing component 502 may include one or more processors 520 to execute instructions to complete all or part of the blocks described above. In addition, the processing component 502 may include one or more function modules to facilitate the interaction between the processing component 502 and other components. For example, the processing component 502 may include a multimedia module to facilitate the interaction between the multimedia component 508 and the processing component 502.

The memory 504 is configured to store different types of data to support the operation of the device 500. Examples of such data include instructions, contact data, phonebook data, messages, pictures, videos, and the like for any application or method that operates on the device 500. The memory 504 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 506 provides power to different components of the device 500. The power supply component 506 may include a power managing system, one or more power supplies, and other components associated with generating, managing, and distributing power for the device 500.

The multimedia component 508 includes a screen that provides an output interface between the device 500 and a user. In some examples, the screen may include a Liquid Crystal Display (LCD) and/or a Touch Panel (TP). If the screen includes a touch panel, the screen may be implemented as a touch screen to receive input signals from the user. The touch panel includes one or more touch sensors to sense a touch, a slide, and a gesture on the touch panel. The touch sensor may sense not only the boundary of the touch or slide action but also the duration and pressure associated with the touch or slide operation. In some examples, the multimedia component 508 includes a front camera and/or a rear camera. The front camera and/or rear camera may receive external multimedia data when the device 500 is in an operating mode, such as a capturing mode or a video mode. Each of the front camera and the rear camera may be a fixed optical lens system or have a focal length and optical zooming capability.

The audio component 510 is configured to output and/or input an audio signal. For example, the audio component 510 includes a microphone (MIC) that is configured to receive an external audio signal when the device 500 is in an operating mode, such as a call mode, a recording mode, and a voice identification mode. The received audio signal may be further stored in the memory 504 or transmitted via the communication component 516. In some examples, the audio component 510 further includes a loudspeaker configured to output the audio signal.

The I/O interface 512 provides an interface between the processing component 502 and a peripheral interface module which may be a keyboard, a click wheel, a button, etc. The button may include, but is not limited to, a home button, a volume button, a start button, and a lock button.

The sensor component 514 includes one or more sensors configured to provide a state assessment of different aspects for the device 500. For example, the sensor component 514 may detect the on/off state of the device 500 and the relative positioning of a component. For example, the component is a display and a keypad of the device 500. The sensor component 514 may further detect a change in the position of the device 500 or one component of device 500, the presence or absence of a contact between a user and the device 500, the orientation or acceleration/deceleration of the device 500, and a change in the temperature of the device 500. The sensor component 514 may include a proximity sensor configured to detect the presence of a nearby object without any physical contact. The sensor component 514 may further include an optical sensor, such as a CMOS or CCD image sensor, for use in imaging applications. In some examples, the sensor component 514 may further include an acceleration sensor, a gyro sensor, a magnetic sensor, a pressure sensor, or a temperature sensor.

The communication component 516 is configured to facilitate wired or wireless communication between the device 500 and other devices. The device 500 may access a wireless network based on a communication standard, such as WIFI, 2G, 3G, or a combination thereof. In one example, the communication component 516 receives a broadcast signal or broadcast-related information from an external broadcast management system via a broadcast channel. In an example, the communication component 516 further includes a Near Field Communication (NFC) module to facilitate short-range communication. For example, the NFC module may be implemented based on a Radio Frequency Identification (RFID) technology, an Infrared Data Association (IrDA) technology, an Ultra Wideband (UWB) technology, a Bluetooth (BT) technology and other technologies.

In an example, the device 500 may be implemented by one or more of an application specific integrated circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, or other electronic components for performing the following acts:

acquiring an environment image of an area;

determining a sub-area to be swept in the area based on the environment image; and controlling a robotic cleaner to reach the sub-area to be swept and perform a sweeping task.

In an example, there is also provided a non-temporary computer-readable storage medium for storing instructions, such as the memory 504 storing instructions thereon. The above instructions may be executed by the processor 520 of the device 500 to complete the above blocks. For example, the non-temporary computer-readable storage medium may be a ROM, a Random Access Memory (RAM), a CD-ROM, a magnetic tape, a floppy disk, and an optical data storage device.

Figure 6:
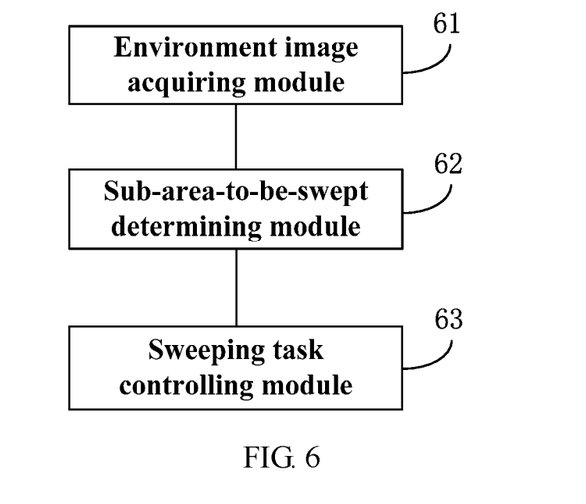
FIG. 6 illustrates a block diagram of a function module of logic of controlling a robotic cleaner according to an example.

FIG. 6 illustrates a block diagram of a function module of logic of controlling a robotic cleaner executed by the processor 520 according to an example. As shown in FIG. 6, the logic of controlling a robotic cleaner may include:

an environment image acquiring module 61 configured to acquire an environment image of an area;

a sub-area-to-be-swept determining module 62 configured to determine a sub-area to be swept in the area based on the environment image acquired by the environment image acquiring module 61; and a sweeping task controlling module 63 configured to control the robotic cleaner to move to the sub-area to be swept determined by the sub-area-to-be-swept determining module 62 and perform a sweeping task.

Figure 7:
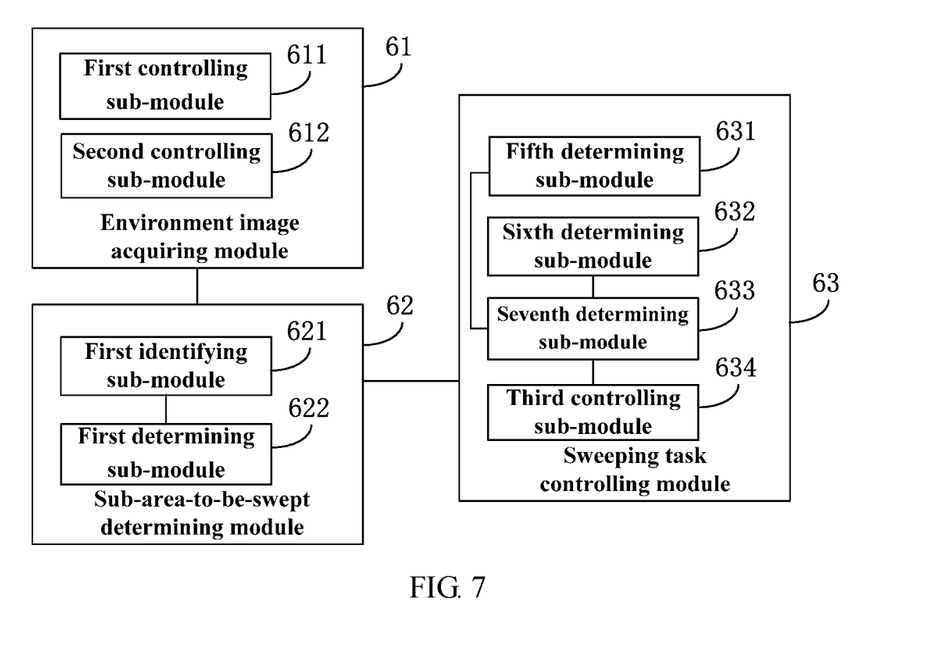
FIG. 7 illustrates a block diagram of a function module of logic of controlling a robotic cleaner according to another example.

FIG. 7 illustrates a block diagram of a function module of logic of controlling a robotic cleaner executed by the processor 520 according to another example. As shown in FIG. 7, on the basis of the above example shown in FIG. 6, the environment image acquiring module 61 may include at least one of:

a first controlling sub-module 611 configured to control an electronic device with an image capturing function located in an area to acquire an environment image; and a second controlling sub-module 612 configured to remotely control an image capturing device provided in the area to acquire an environment image.

In an example, the sub-area-to-be-swept determining module 62 may include:

a first identifying sub-module 621 configured to perform image identification on the environment image to obtain respective cleanliness degrees of different sub-areas in the area; and a first determining sub-module 622 configured to take a sub-area of which the cleanliness degree obtained by the first identifying sub-module 621 is lower than a preset cleanliness threshold as the sub-area to be swept in the area.

In an example, the sweeping task controlling module 63 may include:

a fifth determining sub-module 631 configured to determine a spatial position of the image capturing device for acquiring the environment image;

a sixth determining sub-module 632 configured to determine a first spatial relative position of the image capturing device with respect to the sub-area to be swept;

a seventh determining sub-module 633 configured to determine a spatial position of the sub-area to be swept based on the spatial position of the image capturing device determined by the fifth determining sub-module 631 and the first spatial relative position determined by the sixth determining sub-module 632; and a third controlling sub-module 634 configured to control the robotic cleaner to reach the sub-area to be swept determined by the seventh determining sub-module 633 and perform a sweeping task.

Figure 8:
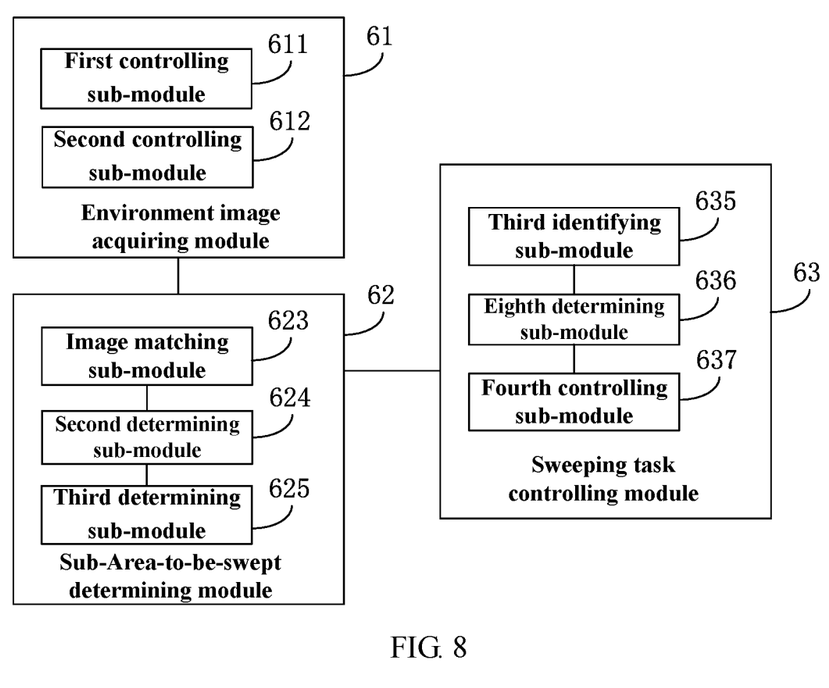
FIG. 8 illustrates a block diagram of a function module of logic of controlling a robotic cleaner according to still another example.

FIG. 8 illustrates a block diagram of a function module of logic of controlling a robotic cleaner executed by the processor 520 according to still another example. As shown in FIG. 8, on the basis of the above example shown in FIG. 6, the environment image acquiring module 61 may include at least one of:

a first controlling sub-module 611 configured to control an electronic device with an image capturing function located in an area to acquire an environment image; and a second controlling sub-module 612 configured to remotely control an image capturing device provided in the area to acquire an environment image.

In an example, the area-to-be-swept determining module 62 may include:

an image matching sub-module 623 configured to compare the environment image with one or more prestored reference images;

a second determining sub-module 624 configured to determine a target reference image determined by the image matching sub-module 623 from the reference images that matches the environment image; and a third determining sub-module 625 configured to determine a sub-area to be swept in the area based on a first pre-set correspondence between the target reference image determined by the second determining sub-module 624 and the spatial area.

In an example, the sweeping task controlling module 63 may include:

a third identifying sub-module 635 configured to identify an image block of the environment image in which the robotic cleaner is located;

an eighth determining sub-module 636 configured to determine a second spatial relative position of the sub-area to be swept with respect to the robotic cleaner based on a positional relationship between an image block of the area to be swept in the environment image and the image block determined by the third identifying sub-module 635 where the robotic cleaner is located; and a fourth controlling sub-module 637 configured to control the robotic cleaner to move to the sub-area to be swept based on the second spatial relative position determined by the eighth determining sub-module 636 and perform a sweeping task in the sub-area to be swept.

Figure 9:
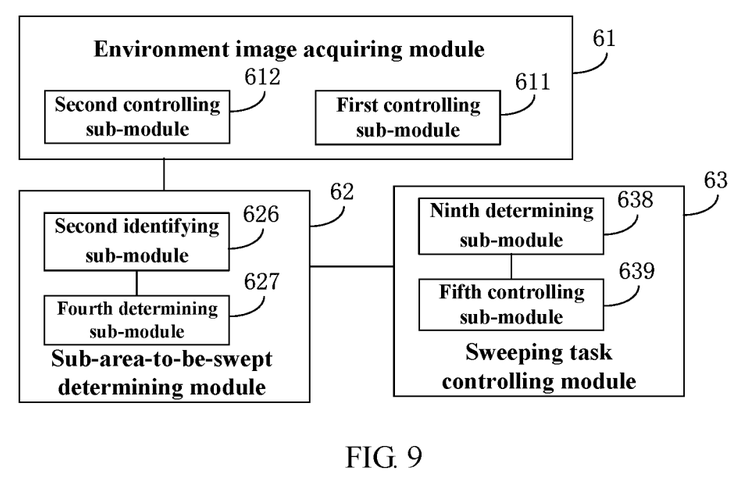
FIG. 9 illustrates a block diagram of a function module of logic of controlling a robotic cleaner according to yet another example.

FIG. 9 illustrates a block diagram of a function module of logic of controlling a robotic cleaner executed by a processor 520 according to yet another example. As shown in FIG. 8, on the basis of the above example shown in FIG. 6, the environment image acquiring module 61 may include at least one of:

a first controlling sub-module 611 configured to control an electronic device with an image capturing function located in an area to acquire an environment image; and a second controlling sub-module 612 configured to remotely control an image capturing device provided in the area to acquire an environment image.

In an example, the sub-area-to-be-swept determining module 62 may include:

a second identifying sub-module 626 configured to identify an object to be swept from the environment image; and a fourth determining sub-module 627 configured to determine a sub-area to be swept in an area based on the position of the object to be swept identified by the second identifying sub-module 626 in the environment image.

In an example, the sweeping task controlling module 63 may include:

a ninth determining sub-module 638 configured to determine a spatial position of the sub-area to be swept based on a second pre-set correspondence between pixel coordinate in the environment image and spatial position in the area and a pixel coordinate of an image block corresponding to the sub-area to be swept in the environment image; and a fifth controlling sub-module 639 configured to control the robotic cleaner to move to the sub-area to be swept identified by the ninth determining sub-module 638 and perform a sweeping task in the sub-area to be swept.

With respect to the device in the above example, the specific manner in which each module performs the operation has been described in detail in the example relating to the method, which will not be described in detail herein.

The present disclosure further provides a robotic cleaner, which includes a processor and a machine-readable storage medium for storing processor-executable instructions. By reading and executing the machine executable instructions stored in the machine-readable storage medium, the processor may be caused to:

acquire an environment image of an area;

determine a sub-area to be swept in the area based on the environment image; and control the robotic cleaner to reach the sub-area to be swept and perform a sweeping task in the sub-area to be swept.

The robotic cleaner is controlled based on the environment image to sweep the area that really needs to be swept, which may improve the sweeping efficiency of the robotic cleaner and may simplify the operation of controlling the robotic cleaner from a user.

The present disclosure further provides an electronic device including the above device for controlling a robotic cleaner shown in FIG. 5. The electronic device may be a user portable terminal (e.g., a mobile phone, a tablet computer, etc.), an image capturing device (e.g., a home camera), a robotic cleaner, etc.

Other examples of the present disclosure will readily occur to those skilled in the art upon consideration of the specification and practice of the present disclosure disclosed herein. The present disclosure is intended to cover any variations, uses, or adaptive changes of the present disclosure that follow the general principles of the present disclosure and include the common general knowledge or conventional technical means in the art that is not disclosed in the present disclosure. The specification and examples are to be merely regarded as exemplary, and the true scope and spirit of the present disclosure is indicated by the following claims.

It is to be understood that the present disclosure is not limited to the accurate structure described above and shown in the accompanying drawings, and that different modifications and changes may be made without departing from the scope thereof. The scope of the present disclosure is limited only by the appended claims.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in the present disclosure or the claims to a 'processor' should thus be interpreted to mean 'one or more processors'.

The figures are only illustrations of an example, where the units or procedure shown in the figures are not necessarily essential for implementing the present disclosure. Those skilled in the art will understand that the units in the device in the example may be arranged in the device in the examples as described, or may be alternatively located in one or more devices different from that in the examples. The units in the examples described may be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

For simplicity and illustrative purposes, the present disclosure is described by referring mainly to an example thereof. In the following description, numerous specific details are set forth to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Throughout the present disclosure, the word "include", or variations such as "includes" or "including", will be understood to imply the inclusion of a stated element, integer or block, or group of elements, integers or blocks, but not the exclusion of any other element, integer or block, or group of elements, integers or blocks.

It will be appreciated by persons skilled in the art that numerous variations and/or modifications may be made to the above examples, without departing from the broad general scope of the present disclosure. The present examples are, therefore, to be considered in all respects as illustrative and not restrictive.

What is claimed is:

1. A method for controlling a robotic cleaner, comprising:
   acquiring an environment image of an area, wherein the environment image comprises a sub-area that needs to be swept by the robotic cleaner;
   determining the sub-area to be swept in the area based on the environment image, wherein determining the sub-area to be swept in the area based on the environment image comprises:
      comparing the environment image with one or more pre-stored reference images, wherein the one or more pre-stored reference images were captured at a prior time than the environment image and comprise the area in a clean state;
      selecting a target reference image from the one or more reference images that matches the environment image;
      determining a spatial area corresponding to the target reference image based on a pre-set correspondence between the one or more reference images and spatial areas, wherein the pre-set correspondence comprises a mapping relationship between the spatial area and the target reference image that reduces a computation complexity of identifying the sub-area to be swept; and
      taking the spatial area corresponding to the target reference image as the sub-area to be swept in the area; and
   controlling the robotic cleaner to reach the sub-area and perform a sweeping task in the sub-area.

2. The method according to claim 1, wherein determining the sub-area to be swept in the area based on the environment image further comprises:
   performing image identification on the environment image to obtain respective cleanliness degrees of different sub-areas in the area; and
   taking a sub-area of which the cleanliness degree is lower than a preset cleanliness threshold as the sub-area to be swept in the area.

3. The method according to claim 1, wherein determining the sub-area to be swept in the area based on the environment image further comprises:
   identifying an object to be swept from the environment image;
   determining a position of the object to be swept in the environment image; and
   determining the sub-area to be swept in the area based on the position of the object to be swept in the environment image.

4. The method according to claim 1, wherein controlling the robotic cleaner to reach the sub-area and perform a sweeping task in the sub-area comprises:
   determining a spatial position of an image capturing device for acquiring the environment image;
   determining a first spatial relative position of the image capturing device with respect to the sub-area;
   determining a spatial position of the sub-area to be swept based on the spatial position of the image capturing device and the first spatial relative position of the image capturing device with respect to the sub-area; and
   controlling the robotic cleaner to reach the sub-area and perform a sweeping task in the sub-area.

5. The method according to claim 1, wherein controlling the robotic cleaner to reach the sub-area and perform the sweeping task in the sub-area comprises:
   identifying a first image block of the environment image in which the robotic cleaner is located;
   determining a second spatial relative position of the sub-area with respect to the robotic cleaner based on a positional relationship between a second image block corresponding to the sub-area and the first image block in the environment image; and
   controlling the robotic cleaner to move based on the second spatial relative position and perform a sweeping task in the sub-area.

6. The method according to claim 1, wherein controlling the robotic cleaner to reach the sub-area and perform a sweeping task in the sub-area comprises:
   determining a spatial position of the sub-area based on a correspondence between pixel coordinates in the environment image and spatial positions in the area and a pixel coordinate of an image block corresponding to the sub-area in the environment image; and
   controlling the robotic cleaner to move to the sub-area and perform a sweeping task in the sub-area.

7. The method according to claim 1, wherein acquiring the environment image of the area comprises at least one of:
   controlling an electronic device with an image capturing function located in the area to acquire the environment image; or
   remotely controlling an image capturing device provided in the area to acquire the environment image.

8. A device for controlling a robotic cleaner comprising a processor and a memory for storing processor-executable instructions, wherein the processor is configured to execute the processor-executable instructions to:
   acquire an environment image of an area, wherein the environment image comprises a sub-area that needs to be swept by the robotic cleaner;
   determine the sub-area to be swept in the area based on the environment image, wherein determining the sub-area to be swept in the area based on the environment image comprises:
      compare the environment image with one or more pre-stored reference images, wherein the one or more pre-stored reference images were captured at a prior time than the environment image and comprise the area in a clean state;
      select a target reference image from the one or more reference images that matches the environment image;

determine a spatial area corresponding to the target reference image based on a pre-set correspondence between the one or more reference images and spatial areas, wherein the pre-set correspondence comprises a mapping relationship between the spatial area and the target reference image that reduces a computation complexity of identifying the sub-area to be swept; and take the spatial area corresponding to the target reference image as the sub-area to be swept in the area; and control the robotic cleaner to reach the sub-area and perform a sweeping task in the sub-area.

9. The device according to claim 8, wherein the processor is further configured to execute the processor-executable instructions to determine the sub-area to be swept in the area by:

performing image identification on the environment image to obtain respective cleanliness degrees of different sub-areas in the area; and taking a sub-area of which the cleanliness degree is lower than a preset cleanliness threshold as the sub-area to be swept in the area.

10. The device according to claim 8, wherein the processor is further configured to execute the processor-executable instructions to determine the sub-area to be swept in the area by:

identifying an object to be swept from the environment image;

determining a position of the object to be swept in the environment image; and determining the sub-area to be swept in the area based on the position of the object to be swept in the environment image.

11. The device according to claim 8, wherein the processor is configured to execute the processor-executable instructions to control the robotic cleaner to reach the sub-area to be swept and perform a sweeping task in the sub-area to be swept by:

determining a spatial position of an image capturing device for acquiring the environment image;

determining a first spatial relative position of the image capturing device with respect to the sub-area to be swept;

determining a spatial position of the sub-area to be swept based on the spatial position of the image capturing device and the first spatial relative position of the image capturing device with respect to the sub-area; and controlling the robotic cleaner to reach the spatial position of the sub-area to be swept and perform a sweeping task in the sub-area to be swept.

12. The device according to claim 8, wherein the processor is configured to execute the processor-executable instructions to control the robotic cleaner to reach the sub-area to be swept and perform a sweeping task in the sub-area to be swept by:

identifying a first image block of the environment image in which the robotic cleaner is located;

determining a second spatial relative position of the sub-area to be swept with respect to the robotic cleaner based on a positional relationship between a second image block corresponding to the sub-area and the first image block in the environment image; and controlling the robotic cleaner to move based on the second spatial relative position and perform a sweeping task in the sub-area to be swept.

13. The device according to claim 8, wherein the processor is configured to execute the processor-executable instructions to control the robotic cleaner to reach the sub-area to be swept and perform a sweeping task in the sub-area to be swept by:

determining a spatial position of the sub-area to be swept based on a correspondence between pixel coordinates in the environment image and spatial positions in the area and a pixel coordinate of an image block corresponding to the sub-area to be swept in the environment image; and controlling the robotic cleaner to move to the sub-area to be swept and perform a sweeping task in the sub-area to be swept.

14. The device according to claim 8, wherein the processor is configured to execute the processor-executable instructions to acquire the environment image of the area by at least one of:

controlling an electronic device with an image capturing function located in the area to acquire the environment image; or remotely controlling an image capturing device provided in the area to acquire the environment image.

15. A non-transitory computer-readable storage medium having stored thereon computer program instructions which cause a processor to perform acts comprising:

acquiring an environment image of an area, wherein the environment image comprises a sub-area that needs to be swept by the robotic cleaner;

determining the sub-area to be swept in the area based on the environment image, wherein determining the sub-area to be swept in the area based on the environment image comprises:

comparing the environment image with one or more pre-stored reference images, wherein the one or more pre-stored reference images were captured at a prior time than the environment image and comprise the area in a clean state;

selecting a target reference image from the one or more reference images that matches the environment image;

determining a spatial area corresponding to the target reference image based on a pre-set correspondence between the one or more reference images and spatial areas, wherein the pre-set correspondence comprises a mapping relationship between the spatial area and the target reference image that reduces a computation complexity of identifying the sub-area to be swept; and taking the spatial area corresponding to the target reference image as the sub-area to be swept in the area; and controlling the robotic cleaner to reach the sub-area and perform a sweeping task in the sub-area.

16. The non-transitory computer-readable storage medium according to claim 15, wherein determining the sub-area to be swept in the area based on the environment image comprises:

identifying an object to be swept from the environment image;

determining a position of the object to be swept in the environment image; and determining the sub-area to be swept in the area based on the position of the object to be swept in the environment image.

17. The non-transitory computer-readable storage medium according to claim 15, wherein controlling the robotic cleaner to reach the sub-area and perform a sweeping task in the sub-area comprises:
> determining a spatial position of an image capturing device for acquiring the environment image;
> determining a first spatial relative position of the image capturing device with respect to the sub-area;
> determining a spatial position of the sub-area to be swept based on the spatial position of the image capturing device and the first spatial relative position of the image capturing device with respect to the sub-area; and
> controlling the robotic cleaner to reach the sub-area and perform a sweeping task in the sub-area.

18. The method according to claim 1, wherein the one or more pre-stored reference images comprise images captured by an image capturing device corresponding to each of the spatial areas at different angles.

19. The device according to claim 8, wherein the one or more pre-stored reference images comprise images captured by an image capturing device corresponding to each of the spatial areas at different angles.

20. The non-transitory computer-readable storage medium according to claim 15, wherein the one or more pre-stored reference images comprise images captured by an image capturing device corresponding to each of the spatial areas at different angles.

* * * * *